(12) United States Patent
Stagg et al.

(10) Patent No.: US 9,748,828 B2
(45) Date of Patent: Aug. 29, 2017

(54) OVERMOLDED FLUX RING

(71) Applicant: BorgWarner Inc., Auburn Hills, MI (US)

(72) Inventors: Jonathan B. Stagg, Bellevue, MI (US); Sanjeev S. Sholapurkar, Marshall, MI (US); Samuel E. Settineri, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 306 days.

(21) Appl. No.: 14/656,606

(22) Filed: Mar. 12, 2015

(65) Prior Publication Data

US 2015/0295487 A1 Oct. 15, 2015

Related U.S. Application Data

(60) Provisional application No. 61/978,844, filed on Apr. 12, 2014.

(51) Int. Cl.
*H02K 49/04* (2006.01)
*F04D 19/00* (2006.01)
*F04D 25/08* (2006.01)
*F04D 29/18* (2006.01)

(52) U.S. Cl.
CPC ......... *H02K 49/046* (2013.01); *F04D 19/002* (2013.01); *F04D 25/08* (2013.01); *F04D 29/181* (2013.01); *F05D 2230/21* (2013.01); *F05D 2300/121* (2013.01); *F05D 2300/171* (2013.01)

(58) Field of Classification Search
CPC .. H02K 49/043; H02K 49/046; F04D 19/002; F04D 25/08; F04D 29/181
USPC ........................................................... 310/105
See application file for complete search history.

(56) References Cited

U.S. PATENT DOCUMENTS

| | | | | |
|---|---|---|---|---|
| 3,316,429 A | * | 4/1967 | Jaeschke | H02K 49/043 310/105 |
| 5,923,105 A | * | 7/1999 | Albrecht | H02K 1/148 310/266 |
| 5,994,810 A | * | 11/1999 | Davis | H02K 49/046 192/84.1 |
| 6,680,555 B1 | * | 1/2004 | Schneider | H02K 49/065 310/103 |
| 2003/0196863 A1 | * | 10/2003 | Faller | F01P 5/10 192/48.3 |
| 2008/0185926 A1 | * | 8/2008 | Dessirier | H02K 9/04 310/63 |
| 2011/0018198 A1 | * | 1/2011 | Prasanna | H02K 49/046 273/237 |
| 2011/0180362 A1 | * | 7/2011 | Swanson | F16D 25/082 192/66.1 |

* cited by examiner

*Primary Examiner* — Terrance Kenerly
(74) *Attorney, Agent, or Firm* — Harness, Dickey & Pierce, P.L.C.; John A. Artz PC

(57) ABSTRACT

An overmolded steel flux ring member for an eddy-current fan drive assembly. The flux ring member includes a base member having a hub member, an annular outer ring member, and a plurality of connecting arm members. An overmolding material, such as aluminum, is overmolded on the annular outer ring member preferably in separate sections. Ventilation openings in said base member allow air to flow past a magnet ring for cooling.

27 Claims, 8 Drawing Sheets

OVERMOLDED FLUX RING

CROSS REFERENCE TO RELATED APPLICATIONS

This application claims the benefit of U.S. Provisional Application Ser. No. 61/978,844, filed Apr. 12, 2014, which is incorporated herein by reference.

TECHNICAL FIELD

The present invention is related to two-speed fan drive assemblies, and more particularly to flux rings for eddy-current fan drive assemblies.

BACKGROUND OF THE INVENTION

Vehicle engines commonly utilize cooling assemblies to remove excess heat from the engine and maintain an optimal operating temperature. The cooling assembly pumps a coolant through the engine and other components in order to control engine temperature. Heat generated within the engine and other components is absorbed by the coolant and dispersed into the surrounding atmosphere through the use of a radiator. In order to improve dispersal by the radiator, it is common to utilize fan assemblies to draw or force air past the radiator to assist in heat transfer.

It is not generally desirable for such fan assemblies to be run continuously. It is desirable to maintain a targeted coolant temperature; high fan speed is only needed during times of high heat generation. Additionally, continuous high speed operation when unnecessary places a non-required draw on the engine and thereby reduces efficiency. To compensate for this, present fan assemblies, such as "On-Off" style fan drives, utilize fan clutch assemblies that allow for the selective engagement of the fan to the engine such that the fans are engaged only when necessary. The fan clutch assemblies may be operated in a host of configurations including electronic, hydraulic and air-pressure actuated. It is common for these systems to be biased towards fan operation such that when failure occurs in the clutch assembly, the fan continuously operates to keep the engine cool.

Most On-Off fan drives operate at only one speed when actuated, namely input speed. In some situations, two-speed fan drives are desired. These drives often utilize an eddy-current mechanism to allow the fan drive to operate at a lower speed. The eddy-current assemblies provide for a much slower fan rotation when the fan is disengaged.

One concern with eddy-current clutches, or "On-Off" accessory drives combined with eddy-current drive assemblies, is the heat generated by the eddy-current drive, particularly heat generated in the flux rings. Not only can the heat reduce the effectiveness of the product, but the heat over time can expand and distort the flux ring, reducing both the durability and life of the product.

It would be highly beneficial if the flux ring for eddy-current clutch assemblies could be provided which had reduced temperatures and reduced stress during operation. This would provide a more durable, longer lasting and more effective eddy-current assembly.

SUMMARY OF THE INVENTION

The present invention provides methods, structures and systems for manufacturing and using improved flux rings for eddy-current assemblies. The invention provides flux rings that are cooled in an improved manner in order to remain at reduced temperatures. In addition, the invention provides flux ring constructions that minimize stress and hoop loads and thus provide products that are more effective, durable and longlasting.

In accordance with a preferred embodiment of the invention, the flux ring includes a metal base member having a central hub member, an outer annular ring member, and a plurality of flexible arm members connecting the hub to the ring member. The base member is preferably made of steel. A plurality of separate sections of another material, such as aluminum, are overmolded on the annular member. The overmolded sections have pluralities of ribs and vanes to aid in distributing heat to the atmosphere.

Ventilation openings are provided between the hub member and overmolded annular member to allow air to be circulated on both sides of the annular member and aid in cooling it. The flexible arm members allow rapid and controlled expansion of the annular member as it is heated, and minimize radial expansion, distortion and stress.

Openings, recesses or other structures on the outer annular ring of the base member can be provided in order to assist in retaining the overmolded sections on the annular member. This can allow three-dimensional differential expansion which minimizes hoop loads and other stresses in the flux ring.

Other features, benefits and advantages of the present invention will become apparent from the following description of the invention in conjunction with the drawings and appended claims.

DESCRIPTION OF PREFERRED EMBODIMENTS

Figure 1:
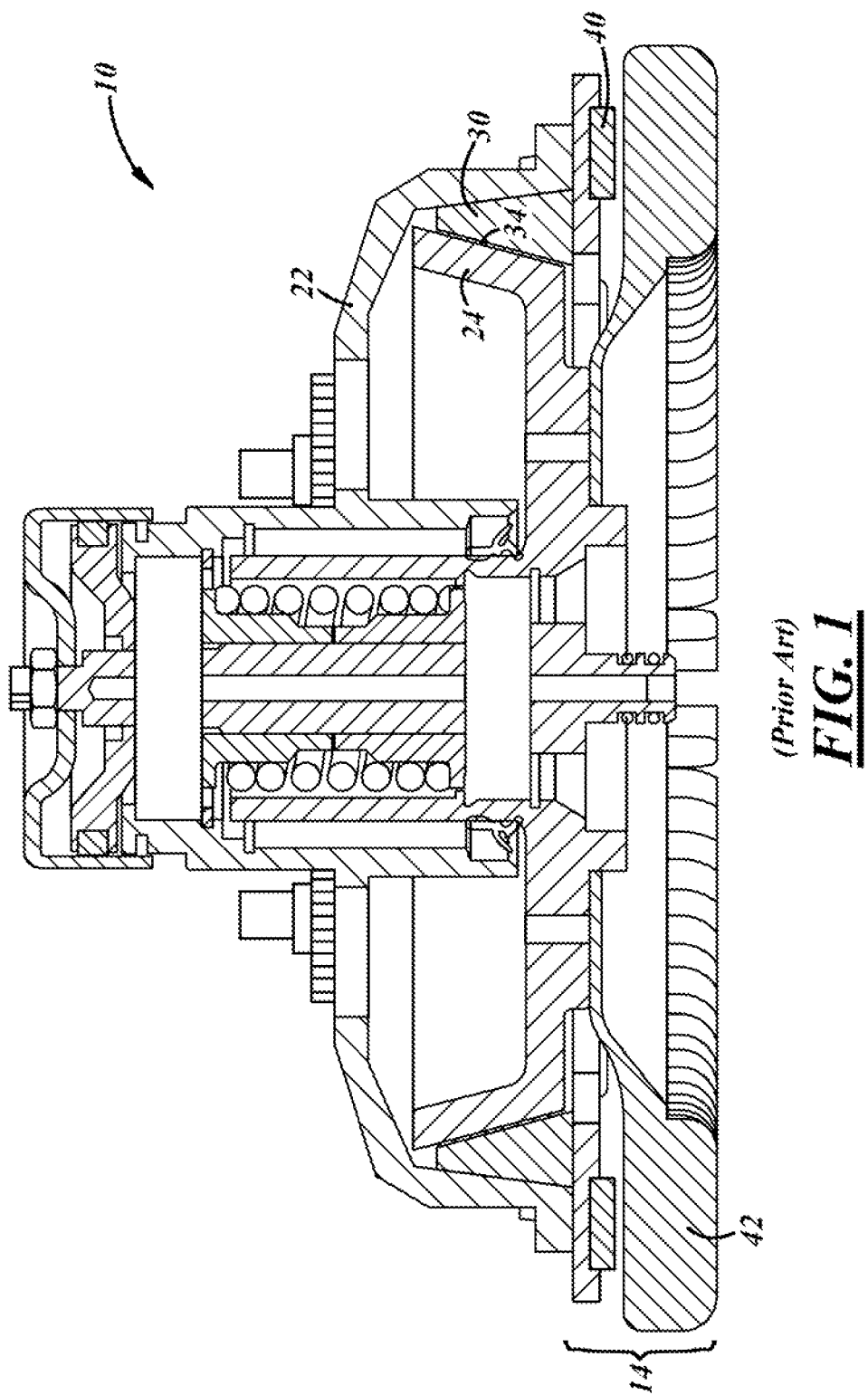
FIG. 1 depicts a conventional two-speed fan drive which includes a eddy-current drive assembly.

FIG. 1 depicts a known two-speed fan drive assembly 10. It includes a pneumatic friction clutch mechanism 12 and an eddy-current fan drive mechanism 14.

The operation and details of two-speed fan drive assemblies as exemplified by assembly 10 are well known, and it is not necessary to describe all aspects of it here. Such assemblies are depicted and described, for example, in U.S.

Pat. Nos. 5,994,810, 6,838,796 and 8,544,627, as well as United States Publication 2011/0180362.

For purposes of the present invention, the two-speed fan drive assembly 10 will be briefly described. It has a pneumatic activated spring-biased outer housing member 22. A fan (not shown) is attached to the housing member. The housing member 22 is attached to a pulley member and is constantly rotating at input speed by an appropriate engine belt member (not shown). The housing member has a first annular friction backing member 30, and the inner actuating member 24 with a second annular friction backing member. Friction material 34 is positioned on and preferably bonded to one of the two friction backing members.

When cooling is needed for the coolant in the engine, no pneumatic pressure is applied and the actuating member and housing member 20 came into contact to allow the friction material to cause the housing and fan to rotate. This is the fan ON condition and the fan will rotate at input speed which is one of the two speeds of the fan drive assembly 10.

When there is no need to operate the fan at the ON speed, pneumatic pressure is applied to the clutch mechanism in the housing. This translates the housing member axially and disconnects the frictional contact between the housing member 20 and inner actuating member 24.

There are many reasons why it is desirable to keep the fan rotating in the vehicle even when it is not necessary to rotate it at input speed. The eddy-current mechanism provides for rotation of the housing and fan member at a second speed lower than the input speed.

The basic components of the eddy-current mechanism 14 are a plurality of permanent magnets 40 and an associated flux ring member 42. Even though power from the frictional contact has ceased, the eddy-currents induced by the magnets and the flux ring keeps the housing and connected fan member rotating at a slower speed. (For example, at about 500-600 rpm.)

One of the concerns with known eddy-current assemblies is the significant heat build-up caused by its operation. Typically, the flux rings are made of an electrically-conductive material, such as aluminum or steel, and when heated to a high temperature rapidly expand. This can cause distortions and can affect the durability and performance of the eddy-current assembly.

The present invention has been provided in order to improve on the structure and performance of flux rings for eddy-current assemblies. The invention has particular use in two-speed fan drive assemblies, as exemplified by the assembly 10 described above.

The preferred embodiment of the improved flux ring member includes a metal base member with sections of another metal material overmolded on it, together with features which provide improved (reduced) radial expansion and increased cooling of the flux ring.

A completed flux ring in accordance with an embodiment of the present invention is depicted in FIGS. 5-8 and indicated by the reference numeral 50. The flux ring includes a metal base member 60, preferably made of a steel, and a plurality of sections 62 of a second material, preferably aluminum, which are overmolded on the base member.

Figure 2:
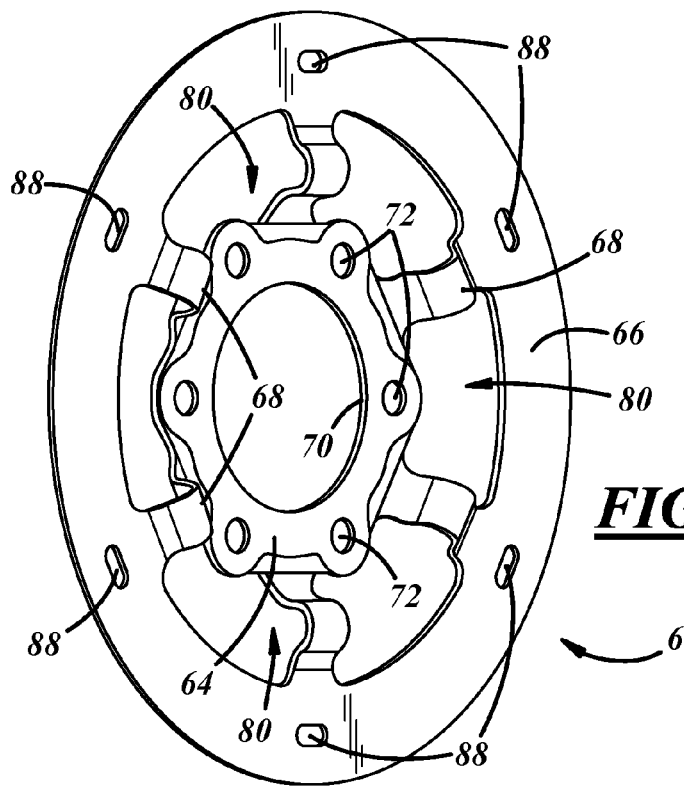
FIG. 2 depicts a perspective view of a flux ring base member in accordance with an embodiment of the present invention.
Figure 3:
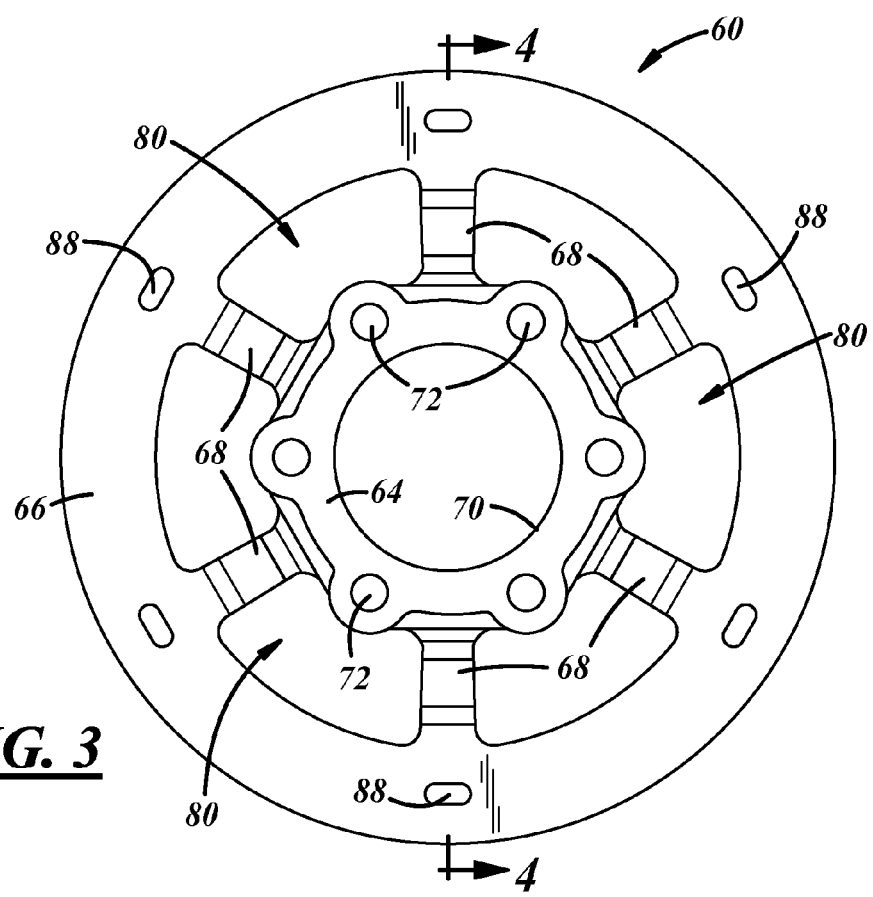
FIGS. 3 and 4 depict the front view and a cross-sectional side view of the flux ring base member in FIG. 2.
Figures 4, 5:
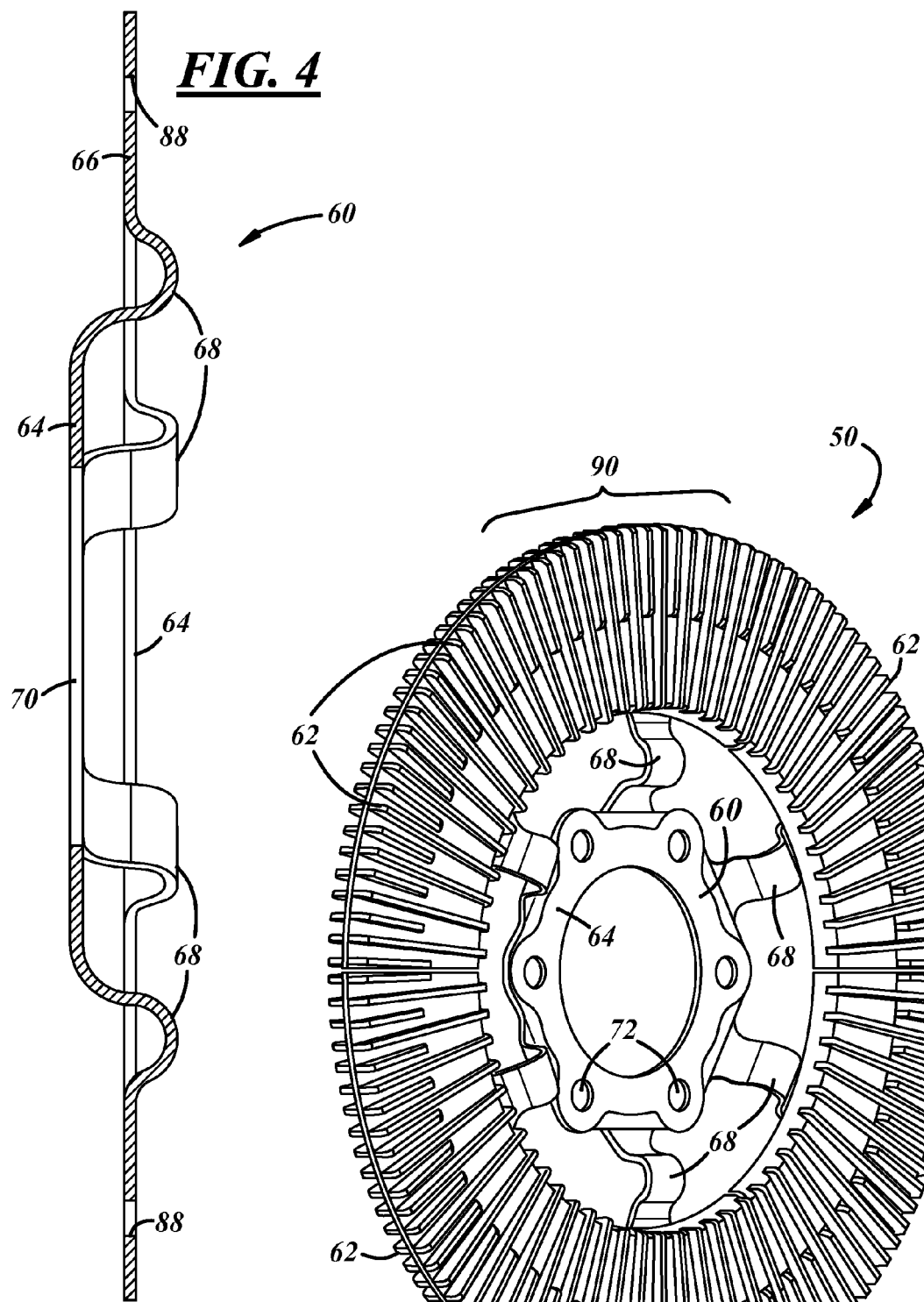
FIG. 5 is a perspective view of an overmolded flux ring in accordance with an embodiment of the present invention.
Figure 6:
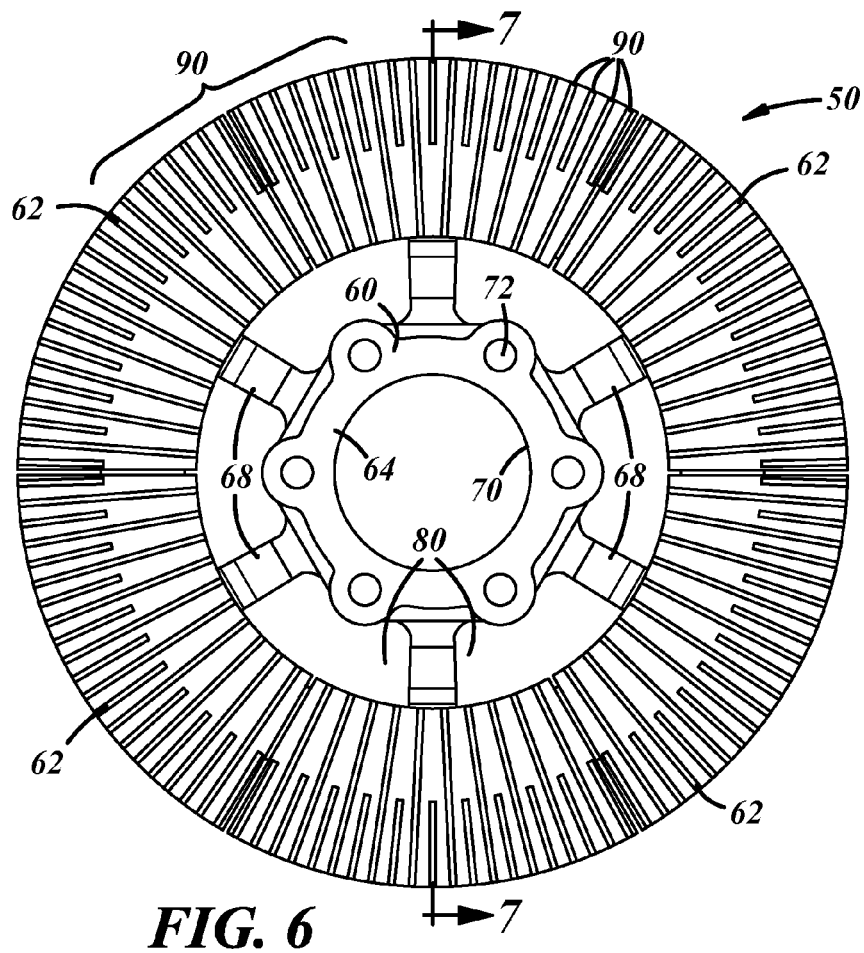
FIGS. 6 and 7 depict a front view and a cross-sectional side view of the overmolded base member as shown in FIG. 5.
Figure 7:
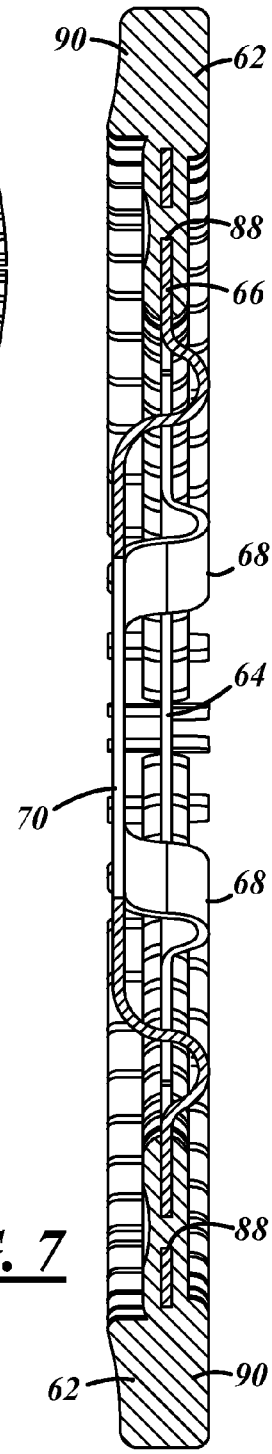
Figure 8:
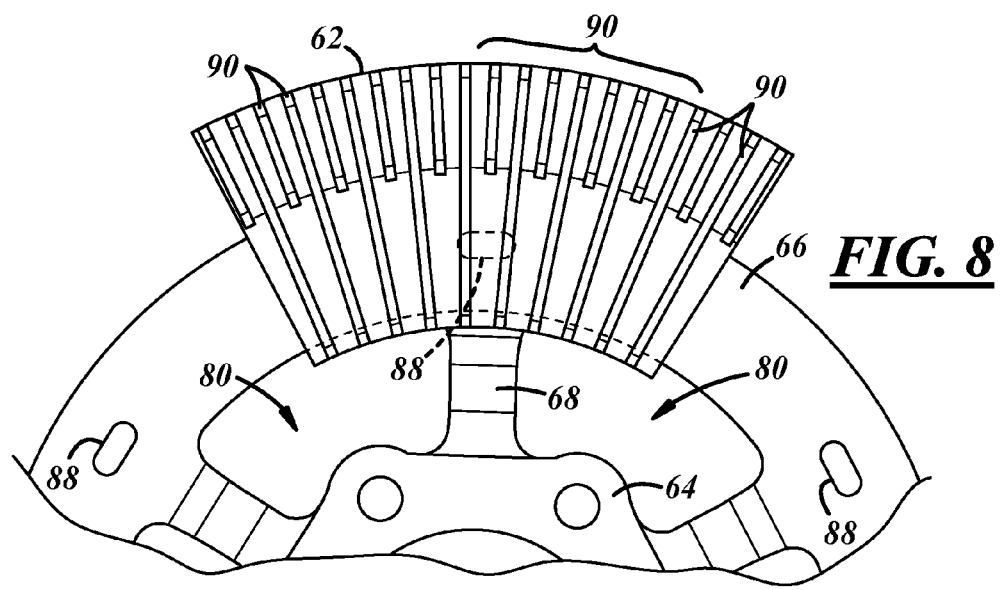
FIG. 8 depicts an overmolded section on a flux ring base member.

The base member 60 is depicted in FIG. 2-4, with FIG. 2 being a perspective view, FIG. 3 being a front plane view, and FIG. 4 being a cross-sectional view. The base member includes a central hub member 64, an annular outer ring member 66 and a plurality of connecting arm members 68.

Figure 9:
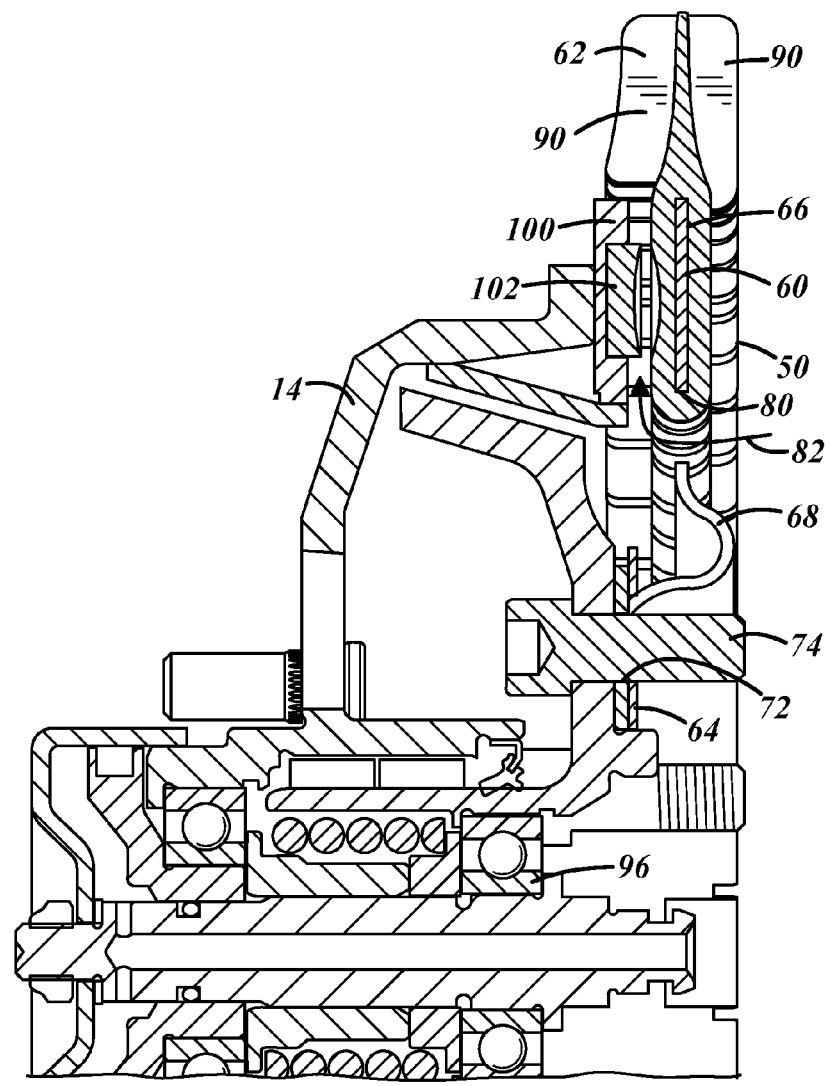
FIG. 9 is a cross-sectional view of a two-speed fan drive assembly utilizing an embodiment of an overmolded flux ring in accordance with the invention.

The base member 60 is preferably made of a metallic metal member, such as steel. Steel material has structural strength, stiffness, and effects the magnetic flux lines. The base member is preferably made from a single piece of material without any welds or connections. It can be made by a stamping process, or any other conventional process, in the shape shown in the Figures. The central hub member 64 has a central opening 70 for assembling with the pneumatic fan drive assembly. A plurality of holes 72 are provided in the hub member in order to fasten and secure the base member (and entire flux ring member 50) to the fan drive assembly. This is shown in FIG. 9. Fasteners, such as bolts 74, are used to secure the member 50 to the fan assembly.

A plurality of arm members 68 connect the base member 60 to the outer annular ring member 66. The radially extending arm members have one or more formed curves therein in order to allow improved radial freedom of movement of the annular ring member 66 relative to the hub member 64. As shown in the Figures, particularly FIGS. 2, 4, 7 and 8, the arm members 64 preferably have a shape with one or more curves and inflection points. This provides the desired strength as well as allow for significant differential expansion between the central hub member and outer annular ring member without inducing high bending stress. Such a configuration is not mandatory, however, and other arm shapes which can accommodate radially expansion without causing significant stress points when heated would be sufficient.

Figure 10:
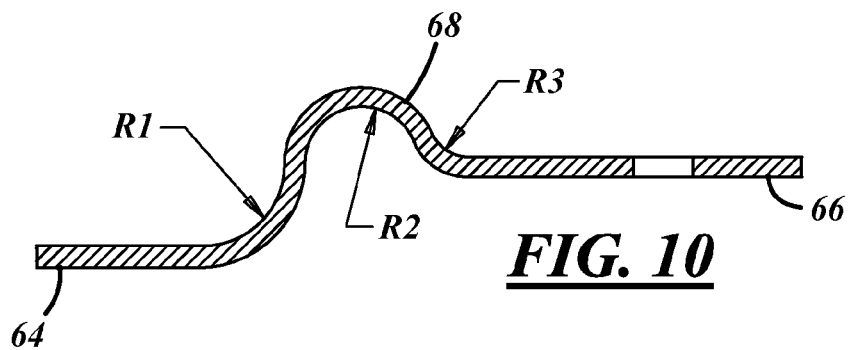
FIG. 10 depicts an arm member in accordance with an embodiment of the invention.

Preferably, the arm member should provide radial compliance. A preferred curved structure for a preferred embodiment of the invention which accomplishes this is shown in FIG. 10. Here, the arm member 68 has three arcs R1, R2 and R3 and two inflection points or reverses of curvature. This equalizes the stress in the arm member, particularly if R1>R2>R3. A greater number of curvatures in the arm member could create additional stresses which are undesirable. Preferably at least one curvature in the arm member between the hub member and annular ring member is desired.

The curves or bends in the spoked arm members preferably follow an "ogee" curve. An ogee curve is shaped somewhat like the letter "S" and can approximate a tangent function. An ogee curve has a pair of oppositely curving arcs extending from and joining two substantially parallel ends. With reference to FIG. 10, the two oppositely curving arcs are R1 and R3 and the two substantially parallel ends are labeled 64 and 66.

The open areas 80 between the arm members 68 provide significant air flow and ventilation when the flux ring is installed in the eddy-current mechanism and in operation. The openings 80 (called "ventilation" areas) allow air to be drawn through them where it can be used to help cool the flux ring on the side adjacent the magnets.

When the flux ring is included as part of the eddy-current mechanism, as shown in FIG. 9, the openings 80 allow cooling air to flow through them and onto the opposite side of the flux ring. This is shown by arrow 82.

FIGS. 5-8 disclose the overmolding in more detail. The outer annular ring 66 on the base member 60 is overmolded by another metal material, such as aluminum. The overmolding is preferably made into a number of separate sections, as shown particularly in FIG. 8. Significant radial air gaps are provided between the overmolded sections. This allows them to expand separately without affecting other areas of the overmolding.

As shown in the drawings, there are six flexible arms 68 on the base member and six separate overmolded sections 62 on the completed flux ring 50. This is the preferred number of arms and sections, but it is not mandatory. The number of arm members and sections could be within the range from 2-24, although the smaller number may not secure the same optimum results, and the larger number may cause further time and cost in the overmolding process. Preferably, 3-12 arm members and sections are provided, with 6 being a preferred number.

In order to attach and adhere the overmolding sections 62 more securely to be the annular ring 66, one or more recesses or openings, such as holes 88, are provided in the annular ring. The over-molding holes 88 are preferably positioned near the geometric centers of each aluminum section. This allows the aluminum material in each segment to expand in all direction freely and uniformly. Although pinning the overmolded segments 62 at one location is preferred, which allows the material with the higher coefficient of expansion to expand in all directions and avoid overstressing, it is possible within the scope of the invention to also pin the segments in other ways. For example, one or more recesses or depressions could be used, or a plurality of small holes or depressions.

In the overmolding, impeller vanes 90 are formed on both sides of the flux ring. This provides more areas for heat to escape into the atmosphere and thus cool the flux ring. The vanes (or "fins") 90 can extend fully or partially across the width of the segments. They can also be an alternating plurality of long and short vanes as shown in the drawings.

Figure 11:
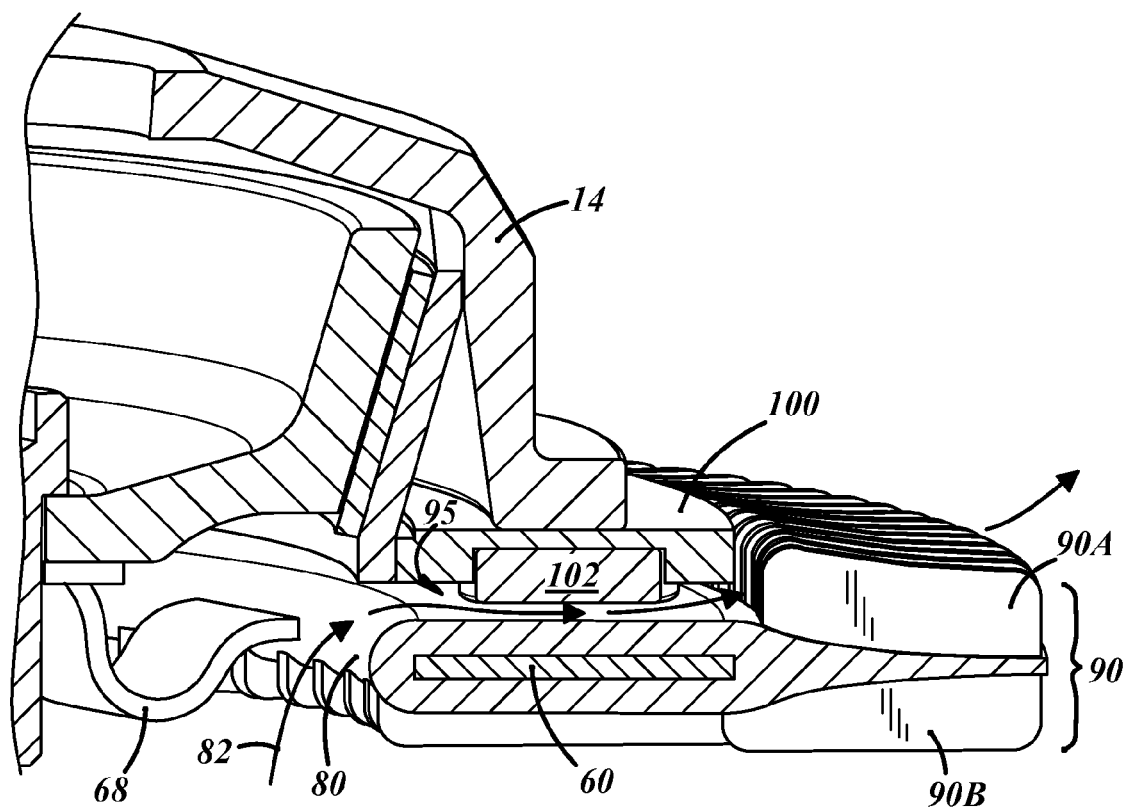
FIG. 11 is an enlarged view depicting improved air flow with an embodiment of the invention.

Vanes (also called "fins") 90 are particularly present on the flux ring radially outward of the air gap 95 between the flux ring and magnets 102. This is shown particularly in FIGS. 9 and 11. In FIG. 11, the vanes 90A are positioned radially outward of the air gap 95. With the preferred embodiment of the invention, as the flux ring rotates, air 82 is induced into and through the ventilation openings 80 in the base member, through the magnet/flux ring air gap 95, and into the vanes 90A.

Also shown in FIG. 9 are the magnet ring 100 and one of the plurality of permanent magnets 102 which are arranged in an annular pattern around the magnet ring. As indicated in eddy-current assemblies, the magnetic flux caused by the magnets in the magnet ring react with the metallic electrically-conductive materials in the flux ring causing the flux ring to rotate. This in turn causes the output member, which is the housing 14 and the fan member, to rotate. Also, the more magnets are used, and the stronger the generation of magnetic force and magnetic flux, the faster the eddy-currents will rotate the fan member.

As shown in FIG. 9, the overmolded flux ring 50 is greater in diameter than the magnet ring 100 and plurality of magnets 102. This allows the air gap between the flux ring and magnets to improve dissipation of the heat generated by the eddy-current assembly. The aluminum vanes 90 transfer heat as being cooling fins, and also by inducing migration of airflow through the ventilation holes 80 in the flux ring to the surface of the flux ring in the air gap.

Radial expansion of the outer annular ring 66 of the steel base member 60 is reduced by the segmentation of the overmolded aluminum material. The use of a single stamped hole, such as holes 88, under each overmolded section 62, allows three-dimensional differential expansion between the aluminum and steel. This minimizes hoop load on the annular steel ring at high temperatures.

The flexible arm members 68 allow more radial expansion of the outer annular steel ring 66 member as compared with the steel portions of the hub member 64. This reduces stresses due to differential thermal expansion. Also, the temperatures at the inner steel hub member are reduced by the invention which protects the bearings 96 and other thermally sensitive components of the pneumatic friction clutch assembly which are in close vicinity or contact to the hub portion.

Comparison tests between two-speed dry-friction fan drives, one with an all aluminum flux ring and one with a flux ring made in accordance with the invention shown that the invention has significant advantages. The maximum temperature was reduced from 209° C. to 158° C., the temperature at the hub member was reduced from 176° C. to 89° C., the maximum principal stress was reduced from 545 MPa to 129 MPa, and the differential radial expansion was reduced from 0.329 mm to 0.213 mm.

Figure 12:
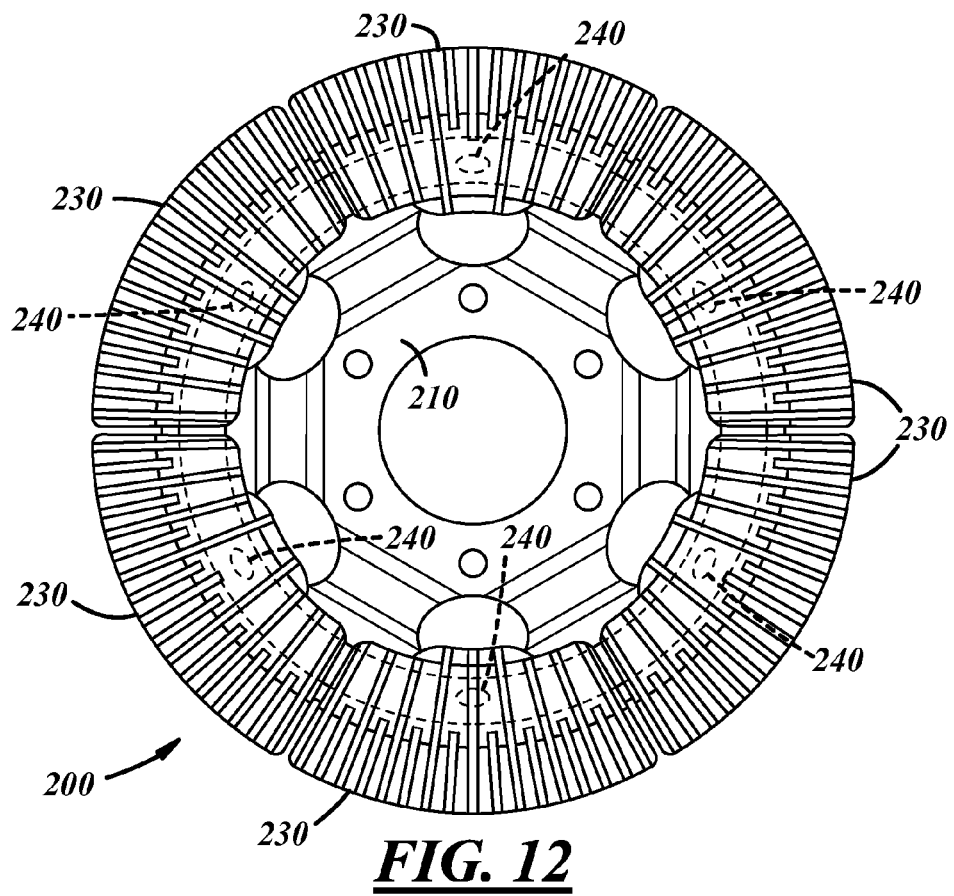
FIGS. 12-14 depict an alternate embodiment of the invention.
Figure 13:
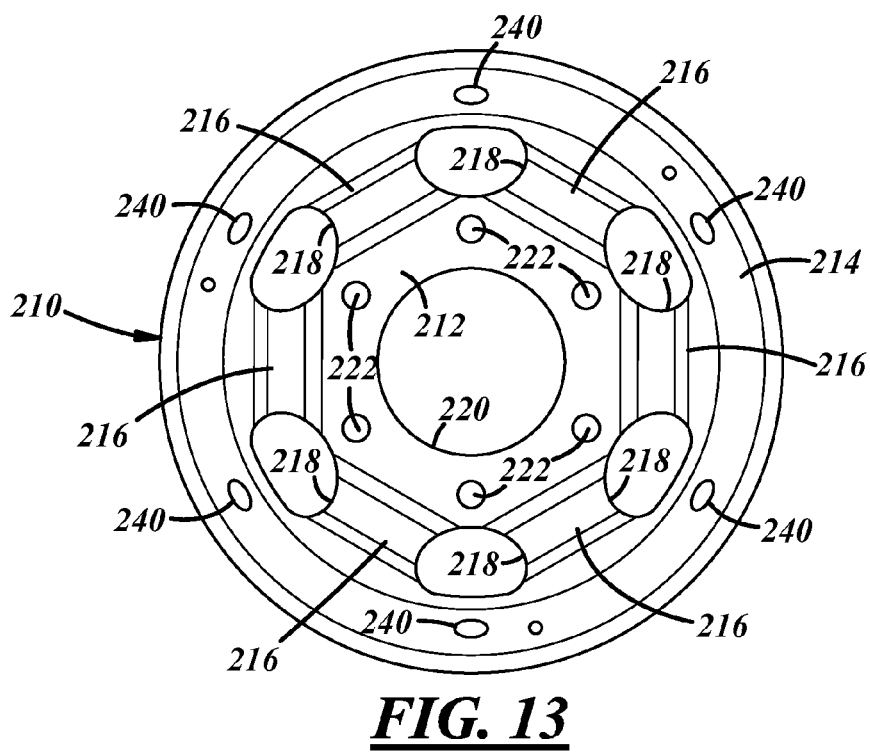
Figure 14:
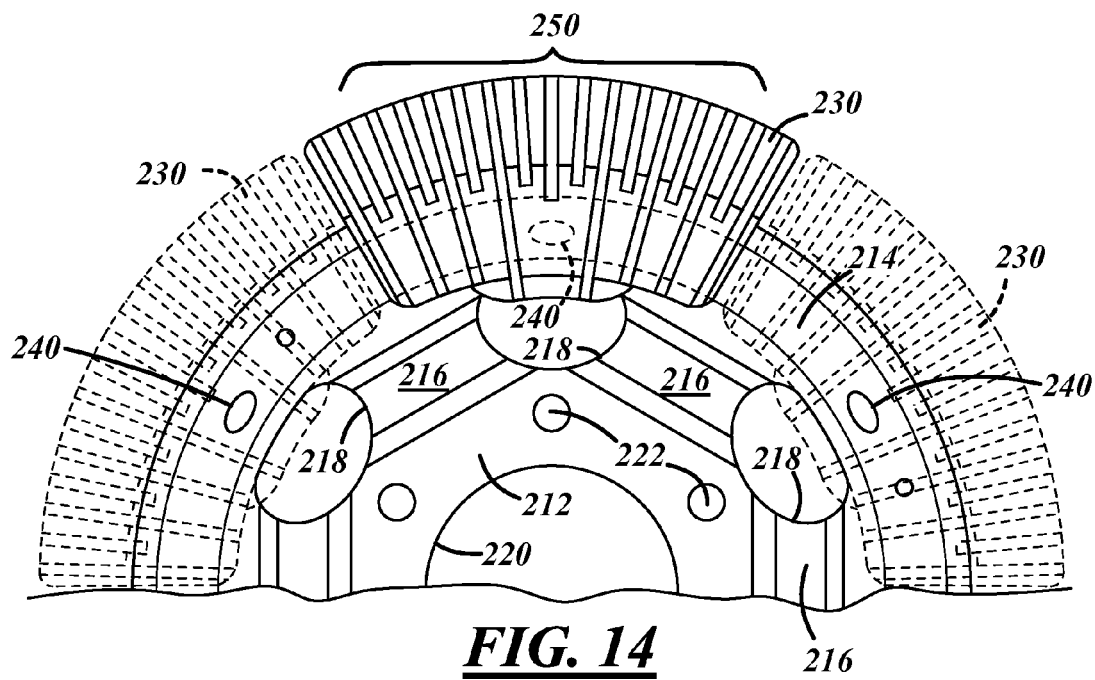

An alternate embodiment of the inventive flux ring is depicted in FIGS. 12-14 and indicated by the reference numeral 200. The flux ring includes a metal base member 210 and a plurality of sections 230 which are overmolded on the base member. The base member 210 is preferably a stamped steel disc-type member. The sections 230 are preferably made of an aluminum material and are overmolded on the base member.

The base member 200 is similar to base member 60 described above, but with some altered features. The base member 200 includes a central hub member 212, an annular outer ring member 214 and a plurality of connecting arm members 216. The arm members 216 are also referred to as "spokes." Openings 218 are formed between the arm members. The hub member 212 has a central opening 220 for assembling the flux ring with the fan drive assembly. A plurality of openings (holes) 222 are provided in the hub member for use in fastening the flux ring to the fan drive assembly.

The arm members 216 each have one or more formed curves in order to allow freedom of movement in the radial direction relative to the hub member 212. This is the same as the arm members 68 discussed above with respect to FIGS. 2-11. Although the arm members 216 are wider than the arm members 68, they preferably have the same or similar curves and inflection points as the arm members 68 discussed above.

The open areas (openings) 218 provide similar air flow and ventilation when the flux ring is installed and operating in an eddy-current mechanism, as discussed above, particularly relative to FIG. 9.

The overmolding of the sections 230 and the number of sections provided are the same as discussed above with respect to FIGS. 2-11.

Openings 240 (also called holes) are also provided in the outer annular ring 214 for the same reasons as discussed above relative to openings 88. The openings 240 are centrally positioned relative to the overmolded sections 230, but are aligned with the openings 218 rather than the spoked arm members 216. This also positions the centers of the overmolded sections 220 between the arm members. This relationship provides ease of manufacturing of the flux ring. Functionally, the two flux ring embodiments depicted should perform the same.

Vanes (or fins) 250 are also provided on one or both sides of the overmolded sections 230. These are the same as the vanes 90 discussed above and are provided for the same reason (air cooling). The number and lengths of the vanes is not critical.

Figure 15:
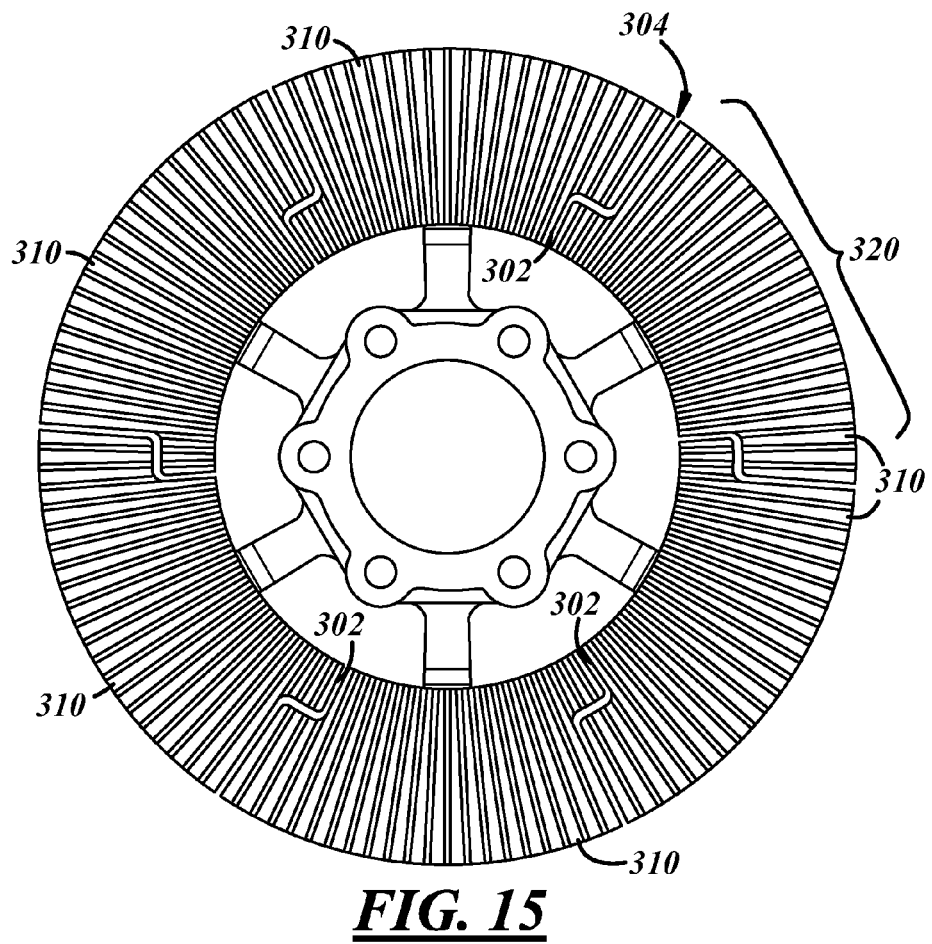
FIG. 15 depicts a further embodiment of the invention.

It is also possible to provide the overmolded sections with overlapping "zig-zag" configurations, as shown in FIG. 15. This flux ring embodiment 300 is essentially the same as the flux ring embodiments 50 and 200 discussed above, but with different side edges 302 and different air gaps 304 between the overmolded sections 310. The hub member and spoked air members can be the same as or similar to the other embodiments discussed above. The overmolded sections 310 also preferably have cooling fins or vanes 320 on one or both sides.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A flux ring for an eddy current assembly, the flux ring comprising:
   a base formed of steel, the base comprising a hub, a ring member and a plurality of arm members, the ring member being disposed circumferentially about the hub and spaced radially from the hub, the plurality of arm members extending radially between the hub and the ring member, the arm members being spaced circumferentially apart from one another; and
   a plurality of flux ring segments that are formed of aluminum, each of the flux ring segments being mounted to the ring member and extending radially outwardly therefrom, the flux ring segments being spaced circumferentially about the ring member and circumferentially apart from one another such that a circumferential gap is disposed between each adjacent pair of the flux ring segments.

2. The flux ring of claim 1, wherein the ring member defines a plurality of attachment apertures, and wherein the flux ring segments are molded over the ring member such that each flux ring segment encapsulates a portion of the ring member and each flux ring segment extends through at least one of the attachment apertures.

3. The flux ring of claim 2, wherein each of the attachment apertures is disposed radially in-line with a portion of an associated one of the arm members that intersects the ring member.

4. The flux ring of claim 2, wherein the encapsulated portion of the ring member includes a portion of a radially inner surface of the ring member.

5. The flux ring of claim 1, wherein each of the arm members defines an arm axis, and wherein each of the flux ring segments has a central axis and is coupled to the ring member such that the central axis is aligned in a circumferential direction to an associated arm axis at a location where an associated one of the arm members intersects the ring member.

6. The flux ring of claim 1, wherein the flux ring has a rotational axis and wherein a first portion of each arm member extends along the rotational axis in a first direction and wherein a second portion of each arm member extends along the rotational axis in a second direction opposite the first direction.

7. The flux ring of claim 6, wherein the ring member is spaced apart from the hub along the rotational axis.

8. The flux ring of claim 1, wherein each of the arm members has a first portion, a second portion and a third portion, the first portion intersecting the hub, the third portion intersecting the ring member, the second portion being disposed radially between the first and third portions; and
   wherein in a radially extending cross-section of the base taken through one of the arm members, the first portion is defined by a first radius, the second portion is at least partly defined by a second radius, and the third portion is defined by a third radius.

9. The flux ring of claim 8, wherein a center of the first radius and a center of the third radius are disposed on a first axial side of the base, and wherein a center of the second radius is disposed on a second axial side of the base that is opposite the first axial side of the base.

10. The flux ring of claim 9, wherein the second radius is larger than the third radius, and wherein the first radius is larger than the second radius.

11. The flux ring of claim 1, wherein each of the flux ring segments defines a plurality of fins.

12. The flux ring of claim 11, wherein at least a portion of the fins comprise vanes of a radial flow fan.

13. The flux ring of claim 12, wherein an inlet of the radial flow fan is provided by the radial spacing between the hub and the ring member.

14. A flux ring for an eddy current assembly, the flux ring being rotatable about a rotational axis, the flux ring comprising:
   a base formed of steel, the base comprising a hub, a ring member and a plurality of arm members, the ring member being disposed circumferentially about the hub and spaced radially from the hub, the plurality of arm members extending radially between the hub and the ring member; and
   a plurality of flux ring segments that are spaced circumferentially about the base such that a circumferential gap is disposed between each adjacent pair of the flux ring segments, each of the flux ring segments being formed of aluminum and encapsulating a portion of the ring member;
   wherein the arm members are configured to attenuate changes in relative spacing along the rotational axis between the hub and the plurality of flux ring segments in response to thermal expansion of the flux ring segments during operation of the flux ring in the eddy current assembly.

15. The flux ring of claim 14, wherein the arm members are further configured to attenuate tilting of the flux ring segments into an orientation that is not perpendicular to the rotational axis in response to thermal expansion of the flux ring segments during operation of the flux ring in the eddy current assembly.

16. The flux ring of claim 14, wherein the ring member defines a plurality of attachment apertures and wherein a portion of each flux ring segment extends through at least one of the attachment apertures.

17. The flux ring of claim 16, wherein each of the attachment apertures is disposed radially in-line with a portion of an associated one of the arm members that intersects the ring member.

18. The flux ring of claim 14, wherein each of the arm members defines an arm axis, and wherein each of the flux ring segments has a central axis and is coupled to the ring member such that the central axis is aligned in a circumferential direction to an associated arm axis at a location where an associated one of the arm members intersects the ring member.

19. The flux ring of claim 14, wherein the flux ring has a rotational axis and wherein a first portion of each arm member extends along the rotational axis in a first direction and wherein a second portion of each arm member extends along the rotational axis in a second direction opposite the first direction.

20. The flux ring of claim 19, wherein the ring member is spaced apart from the hub along the rotational axis.

21. The flux ring of claim 14, wherein each of the arm members has a first portion, a second portion and a third portion, the first portion intersecting the hub, the third portion intersecting the ring member, the second portion being disposed radially between the first and third portions; and wherein in a radially extending cross-section of the base taken through one of the arm members, the first portion is defined by a first radius, the second portion is at least partly defined by a second radius, and the third portion is defined by a third radius.

22. The flux ring of claim 21, wherein a center of the first radius and a center of the third radius are disposed on a first axial side of the base, and wherein a center of the second radius is disposed on a second axial side of the base that is opposite the first axial side of the base.

23. The flux ring of claim 22, wherein the second radius is larger than the third radius, and wherein the first radius is larger than the second radius.

24. The flux ring of claim 14, wherein each of the flux ring segments defines a plurality of fins.

25. The flux ring of claim 24, wherein at least a portion of the fins comprise vanes of a radial flow fan.

26. The flux ring of claim 25, wherein an inlet of the radial flow fan is provided by the radial spacing between the hub and the ring member.

27. A method for forming a flux ring, the method comprising:

providing a base formed of steel, the base comprising a hub, a ring member and a plurality of arm members, the ring member being disposed circumferentially about the hub and spaced radially from the hub, the plurality of arm members extending radially between the hub and the ring member; and overmolding a plurality of flux ring segments onto the ring, the flux ring segments being spaced circumferentially about the base such that a circumferential gap is disposed between each adjacent pair of the flux ring segments, each of the flux ring segments being formed of aluminum and encapsulating a portion of the ring member;

wherein the arm members are configured to attenuate changes in relative spacing along the rotational axis between the hub and the plurality of flux ring segments in response to thermal expansion of the flux ring segments during operation of the flux ring in the eddy current assembly.

\* \* \* \* \*